United States Patent
Chandrasekhar et al.

(10) Patent No.: US 12,368,502 B1
(45) Date of Patent: Jul. 22, 2025

(54) SYSTEM FOR INTERFERENCE MITIGATION IN A SATELLITE COMMUNICATION SYSTEM

(71) Applicant: AMAZON TECHNOLOGIES, INC., Seattle, WA (US)

(72) Inventors: Vikram Chandrasekhar, San Jose, CA (US); Mustafa Cenk Erturk, Issaquah, WA (US); Arunabha Ghosh, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 421 days.

(21) Appl. No.: 17/662,952

(22) Filed: May 11, 2022

(51) Int. Cl.
*H04B 7/185* (2006.01)

(52) U.S. Cl.
CPC ..... *H04B 7/18519* (2013.01); *H04B 7/18513* (2013.01); *H04B 7/18515* (2013.01)

(58) Field of Classification Search
CPC .......... H04B 7/18519; H04B 7/18513
See application file for complete search history.

(56) References Cited

U.S. PATENT DOCUMENTS

| | | | |
|---|---|---|---|
| 12,003,350 B1* | 6/2024 | McCormick | H04L 25/0202 |
| 2015/0229385 A1* | 8/2015 | Roos | H04B 7/18508 |
| | | | 370/317 |
| 2022/0095303 A1* | 3/2022 | Colucci | H04W 72/0453 |

* cited by examiner

*Primary Examiner* — Wayne H Cai
(74) *Attorney, Agent, or Firm* — Lindauer Law, PLLC

(57) ABSTRACT

A radio network with many endpoints, such as many user terminals (UTs) accessing a constellation of many satellites, may experience self-interference due to reduced apparent angular separation between endpoints. For example, many UTs that are covered by a satellite's antenna gain pattern of an uplink may interfere with one another if those UTs use the same frequencies at the same time. The UTs may be geographically separated, but due to relative position between them and the satellite, they appear within the same gain pattern. Resource mapping is performed to allocate link resources to mitigate self-interference. A conflict graph is determined and used to allocate link resources, such as particular combinations of timeslot and frequency, to reduce or eliminate self-interference. The conflict graph may be determined using one or more analytical or heuristic techniques. Resource allocation may be performed for links such as satellite uplinks, satellite downlinks, or both.

20 Claims, 8 Drawing Sheets

SYSTEM FOR INTERFERENCE MITIGATION IN A SATELLITE COMMUNICATION SYSTEM

BACKGROUND

Multipoint radio networks may provide communication services using a one-to-many topology or many-to-many topology. For example, a one-to-many topology may include a first station communicating with many other stations. In another example, a many-to-many topology may include a plurality of stations communicating with a plurality of other stations. A constellation of satellites may provide communication services to many user terminals.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
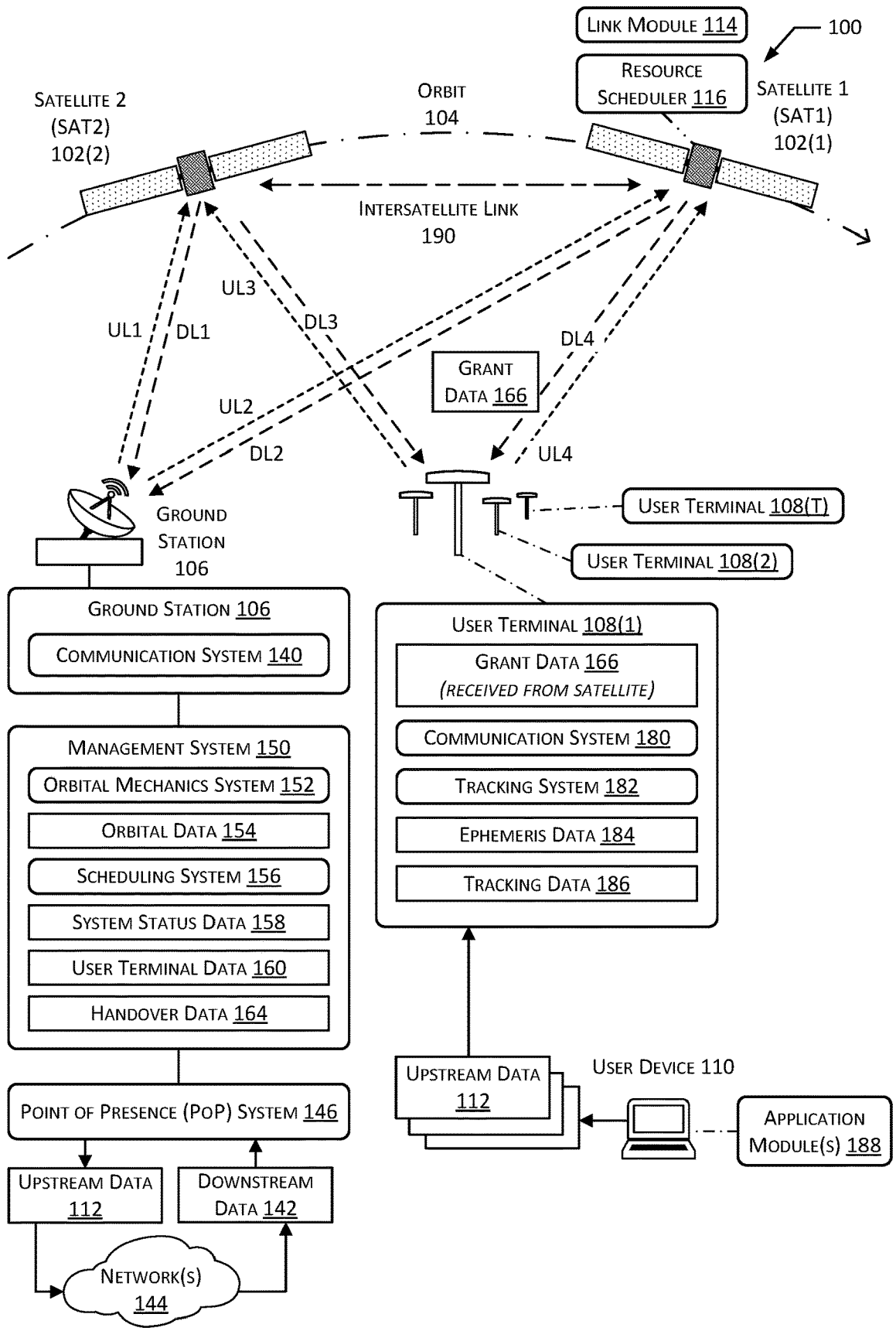
FIG. 1 illustrates a satellite system that implements interference mitigation, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, the cost to place and maintain individual satellites is relatively high. Even with a large constellation of satellites, given the large geographic coverage area of a given satellite and a substantial number of user terminals (UTs) served by each satellite, contention for uplink and downlink resources is substantial, as is the possibility for interference. For example, if different UTs in different locations attempt to use the same frequency at the same time to send data to the satellite, the satellite will experience co-channel interference between these incoming signals. This interference may result in substantial degradation of performance, or loss of communication entirely.

The period, or duration, of an orbit varies depending upon the altitude of the satellite with respect to the body being orbited, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. This results in a UT being frequently handed off from one satellite to another to maintain continuous communication services. For example, these handoffs may occur about every nine minutes. In comparison, a geosynchronous satellite has an orbital period that coincides with the rotation of the Earth, so a geosynchronous satellite appears to remain motionless with respect to the Earth. While the apparent motionlessness with respect to the UT removes the need for handoffs, other drawbacks associated with the geosynchronous satellite remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate contention for satellite uplink and downlink resources, and management of those resources. For example, as mentioned earlier, an individual satellite is only within communication range of a UT for a few minutes, and the relative positions of the UTs being serviced and the satellite changes. This motion results in changing geometry between the UTs and the satellites. The antennas of the UT and the antennas of the satellite also have defined antenna gain patterns that experience "roll-off" or a decrease in signal gain with respect to a centerline of the pattern. As a result of the changing geometry, at different relative positions in the orbit, the satellite may receive within a particular received subbeam additional signals from other UTs. If these additional signals overlap in time and frequency, they will interfere with one another.

Traditional resource allocation techniques have involved real-time exchange of data between the participating devices. For example, a traditional system may utilize many modems to provide communication to many endpoints. Scheduling of communication resources such as timeslot and frequency would be centrally planned and coordinated. However, this approach fails as the overall size and complexity of the communication system increases. For example, while real-time communication may be feasible between four modems with relatively slow radio frame rates, it is infeasible due to cost and complexity to provide real-time coordination between hundreds of modems supporting faster radio frame rates.

Described in this disclosure are systems and techniques for determining conflict data and using this conflict data to coordinate scheduling by systems such as modems. The conflict data may be based on several inputs. One input includes the relative geometry at a specified time between stations such as a satellite and "spots" or geographic areas that may contain UTs for the satellite to service. Another input is information about the antenna gain pattern, such as information about uplink receive antenna gain pattern roll-off. Other inputs may indicate which modems have been assigned to provide service to particular spots.

The conflict data provides information about resources, such as spots or modems, that have the potential to produce interference due to their apparent adjacency with respect to a station, such as the satellite. For example, the conflict data may indicate those spots that, given the receive antenna gain patterns for beams servicing those spots, would result in co-channel interference if the same resources such as timeslot and frequency were simultaneously used within those spots.

The conflict data may then be used to coordinate the operation of individual spot schedulers. The spot schedulers may then allocate particular communication resources subject to the limitations specified in the conflict data. The resulting allocation of communication resources may mitigate or eliminate interference due to other network elements, such as co-channel interference from UTs.

By using the system and techniques described in this disclosure, interference is decreased, allowing use of higher throughput modulation and coding schemes. As a result, throughput is substantially improved, improving network efficiency.

ILLUSTRATIVE SYSTEM

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites is limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of communication satellites 102(1), 102(2), . . . , 102(S), each communication satellite 102 being in orbit 104. Also shown is a ground station 106, user terminals (UTs) 108, and user devices 110. Each user device 110 may execute one or more application modules 188. For example, the application modules 188 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104.

Each satellite 102 may include a link module 114 and resource scheduler 116. The link module 114 is used to establish communication with other devices. The link module 114 may include one or more processors transmitters, receivers, antennas, digital signal processors, and so forth. The resource scheduler 116 may comprise one or more processors executing instructions to manage the link module 114 and maintain communication service such as a radio communication link with other devices. For example, the resource scheduler 116 may receive requests for allocation of uplink resources from individual UTs 108, determine grant data 166 allocating uplink resources to the requesting UTs 108, send the grant data 166 to the requesting UTs 108, and so forth. The resource scheduler 116 may also allocate downlink resources during operation. The satellite 102 is discussed in more detail with regard to FIG. 2.

The resource scheduler 116 may determine conflict data indicative of potential interference and use the conflict data to determine resource allocation such as timeslot, frequency, and so forth allocated to a particular spot or geographic area. Operation of the resource scheduler 116 is discussed in more detail with regard to FIGS. 3-8.

A ground segment of the system 100 may comprise one or more ground stations 106 that are in communication with one or more satellites 102. The ground stations 106 may pass data between the satellites 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground segment may include or utilize one or more communication networks 144. For example, the ground station 106 may connect to a terrestrial fiber optic communication network 144. The ground station 106 may act as a network gateway, passing data between the one or more communication networks 144 and the satellites 102, between ground stations 106, and so forth. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased antenna arrays), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. During operation, the scheduling system 156 may use information such as the orbital data 154, system status data 158, user terminal data 160, and so forth. In some implementations, the scheduling system 156 may implement one or more of the operations described with respect to the resource scheduler 116.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a geographic location (geolocation) of a particular UT 108. The user terminal data 160 may also include other information such as a priority assigned to data associated with that UT 108, a type or category of UT that is indicative of the communication capabilities of that particular UT 108, and so forth. For example, a first UT 108(1) may be a first category of device that has more powerful transmitters, backup power supply, and so forth and may be used in a business. Continuing the example, a second UT 108(2) may be in a second category of device, using less expensive and less powerful transmitters, omitting the backup power supply, and may be used at a residence. The user terminal data 160 may also include information such as a priority allocation associated with a particular UT 108. For example, the first UT 108(1) may be assigned a higher priority relative to the second UT 108(2). Over time, different versions, types, or categories of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

While providing communication services to a first set of UTs 108, the resource scheduler 116 of the first satellite 102(1) manages access. This may include managing access by the first set of UTs 108 to one or more of the uplink or the downlink. This management may include, but is not limited to, allocating communication resources of the uplink to the individual UTs 108 in the first set of UTs 108. For example, the first UT 108(1) may request uplink resources to send 10 MB of data, while the second UT 108(2) requests uplink resources to send 15 MB, and so forth.

The scheduling system 156 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations, the handover data 164 may include a set of next satellites 102. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, a secondary satellite 102(3), the UT 108, or other devices. For example, the second satellite 102(2) may use a UT 108 to relay the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

The satellite 102 providing communication services may manage its uplink by providing grant data 166 to UTs 108. The grant data 166 is indicative of one or more parameters associated with uplink communication between the UT 108 and the satellite 102. For example, the grant data 166 may indicate the uplink frequency, downlink frequency, assigned timeslot, signal encoding, quantity of data permitted to be sent, and forth. In one implementation, the grant data 166 may be generated by the satellite 102. For example, the satellite 102(1) may receive uplink requests and responsive to those uplink requests send grant data 166.

The UT 108 includes a communication system 180 to establish communication with one or more satellites 102 and transfer data. The communication system 180 may comprise a network interface. The UT 108 passes data between the constellation of satellites 102 and the user device 110. The user device 110 may execute one or more application modules 188. The data transferred includes upstream data 112 sent by the user device 110 or downstream data 142 that is addressed to the UT 108 or the user device 110. For example, during operation the application module 188 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

During operation, the communication system 180 may utilize the grant data 166 received from the satellite 102. For example, the UT 108 may request uplink resources to send the upstream data 112. Responsive to the request, the satellite 102 may send grant data 166 allocating uplink resources for the UT 108 to use to send the upstream data 112 to the satellite 102.

The communication system 180 of the UT 108 may include components similar to those of the communication system of a satellite 102 and may perform similar communication functionalities. For example, the communication system 180 may include one or more modems, digital signal processors, power amplifiers, antennas (including at least one antenna that implements multiple antenna elements, such as a phased antenna array), processors, memories, storage devices, communications peripherals, interface buses, and so forth. Continuing the example, the network interface may comprise the communication system 180.

The UT 108 includes a tracking system 182. The tracking system 182 uses ephemeris data 184 to determine tracking data 186. The ephemeris data 184 provides information indicative of orbital elements of the orbit 104 of one or more satellites 102. For example, the ephemeris data 184 may comprise orbital elements such as "two-line element" data for the satellites 102 in the constellation that are broadcast or otherwise sent to the UTs 108 using the communication system 180.

The tracking system 182 may use the current location of the UT 108 and the ephemeris data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102(2), time of flight correction, or other information associated with a specified time. The determination of the tracking data 186 may be ongoing. For example, the first UT 108 may determine tracking data 186 every 100 ms, every second, every five seconds, or at other intervals.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106.

In some implementations, the satellites 102 may also be in communication with one another. For example, an inter-satellite link (ISL) 190 may provide for communication between satellites 102 in the constellation.

The UT 108 may send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

Ground stations 106 may have more substantial communication infrastructure, such as uplink transmitters with greater power than a UT 108, antennas with greater gain than a UT 108, sites that provide clear line of sight from horizon to horizon, and so forth. A ground station 106 may be in communication with a plurality of satellites 102 at a time. In some implementations, the ground station 106 may implement the resource scheduler 116 as described herein.

The system 100 may include one or more point of presence (PoP) systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

The PoP systems 146 may manage communication between the system 100 and the network 144. For example, a first PoP system 146 may receive the upstream data 112 and send that upstream data 112 to the network 144. In another example, the first PoP system 146 may receive the downstream data 142 and proceed to attempt delivery of the downstream data 142 to the UT 108.

The PoP system 146 is in communication with one or more ground stations 106(1), 106(2), . . . , 106(G) and the management system 150. In some implementations one or more functions may be combined. For example, the PoP system 146 may perform one or more functions of the management system 150. In another example, the PoP system 146 may be included in an integrated ground station 106.

The PoP system 146 may determine the UT 108 that the downstream data 142 is addressed to and determines first communication resource data. The first communication resource data specifies the communication resources, such as ground station 106, uplink modem at the ground station 106, satellite 102, downlink modem on the satellite 102, and so forth that would result in delivery of the downstream data 142 to the UT 108. The downstream data 142 may comprise a single packet or other unit of data transfer, or a plurality of packets or other units of data transfer that are associated with delivery to the particular UT 108.

The satellite 102, the ground station 106, the user terminal 108, the user device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
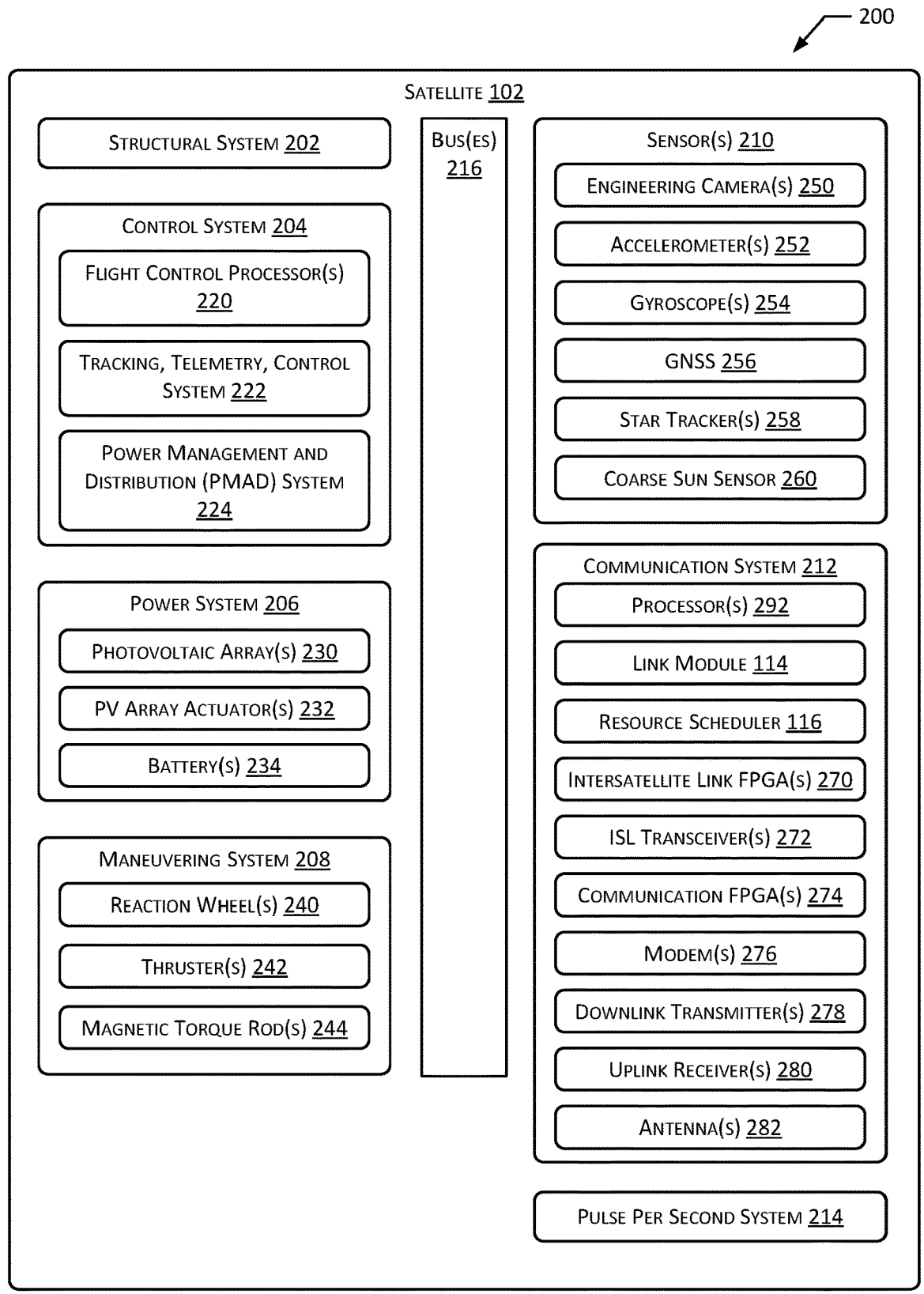
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may comprise one or more processors 292 to execute instructions. The communication system 212 may comprise the link module 114 and the resource scheduler 116. In one implementation, the link module 114 may comprise an antenna 282 such as a phased antenna array (PAA) that is capable of simultaneously providing multiple subbeams. A subbeam may be targeted to cover a specified portion of the Earth or a "spot" (see FIG. 3) while the satellite 102 is in a particular portion of the orbit 104. For example, the link module 114 may adjust or steer the direction of the subbeam relative to the satellite 102 to keep the subbeam pointed at a target location on the Earth while the satellite 102 is above the horizon and in range of that target location. As the satellite 102 moves out of range of the target location, the subbeam may be retargeted to another target location that is moving into range. The different subbeams on the satellite 102 may be directed to different spots. In another implementation, the subbeam may continuously sweep across the surface of the Earth, such as in a line parallel to a ground track of the satellite 102.

The communication system 212 may include one or more modems 276, digital signal processors, power amplifiers, antennas (including at least one antenna that implements multiple antenna elements, such as a phased antenna array) 282, processors 292, memories, storage devices, communications peripherals, interface buses 216, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission. The modems 276 operate in conjunction with other components, such as receivers, transmitters, and one or more antennas 282 to one or more of send or receive data.

Each satellite 102 may use one or more antennas 282 or antenna elements to provide a beam for transmission and reception of radio signals. For example, the satellite 102 may have a phased antenna array that allows for gain in a particular direction, producing an antenna gain pattern. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular spot comprising a geographic area. Compared to a single beam, subbeams provide several advantages. For example, by using subbeams, radio frequencies may be reused by the same satellite 102 and other satellites 102 to service different areas. This allows increased density of UTs 108 and bandwidth. The resource scheduler 116 may operate as discussed below to mitigate the potential for interference, such as co-channel interferent from multiple UTs 108.

During a pass over of a particular location on the Earth, each subbeam may be targeted to a geographic location on the Earth. While that target spot is in range of the satellite 102, the subbeam tracks the target spot. As the satellite 102 moves in orbit 104, the boundary of the footprint of the subbeam on the surface changes due to the relative angle between the satellite 102 and the Earth. For example, the footprint boundary of the subbeam may change from approximately an oval shape while the satellite 102 is low on the horizon relative to the target location, to a circular shape while directly overhead, then to an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam and the corresponding spot. For example, a first modem 276(1) provides communication to UTs 108 in a first spot using a first subbeam while a second modem 276(2) provides communication to UTs 108 in a second spot using a second subbeam.

In some implementations, the communication system 212 may include hardware to support the intersatellite link 190. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased antenna array may be used to provide communication between the satellite 102 and the UTs 108.

The communication system 212 may determine grant data 166 that specifies uplink resources for a UT 108 to communicate with the satellite 102. For example, the communication FPGA 274 may process a grant request that is received from a UT 108 by the uplink receiver 280. Responsive to the grant request, and subject to the resource scheduler 116, the communications FPGA 274 may determine grant data 166 that is then sent using the downlink transmitter 278.

Figure 3A:
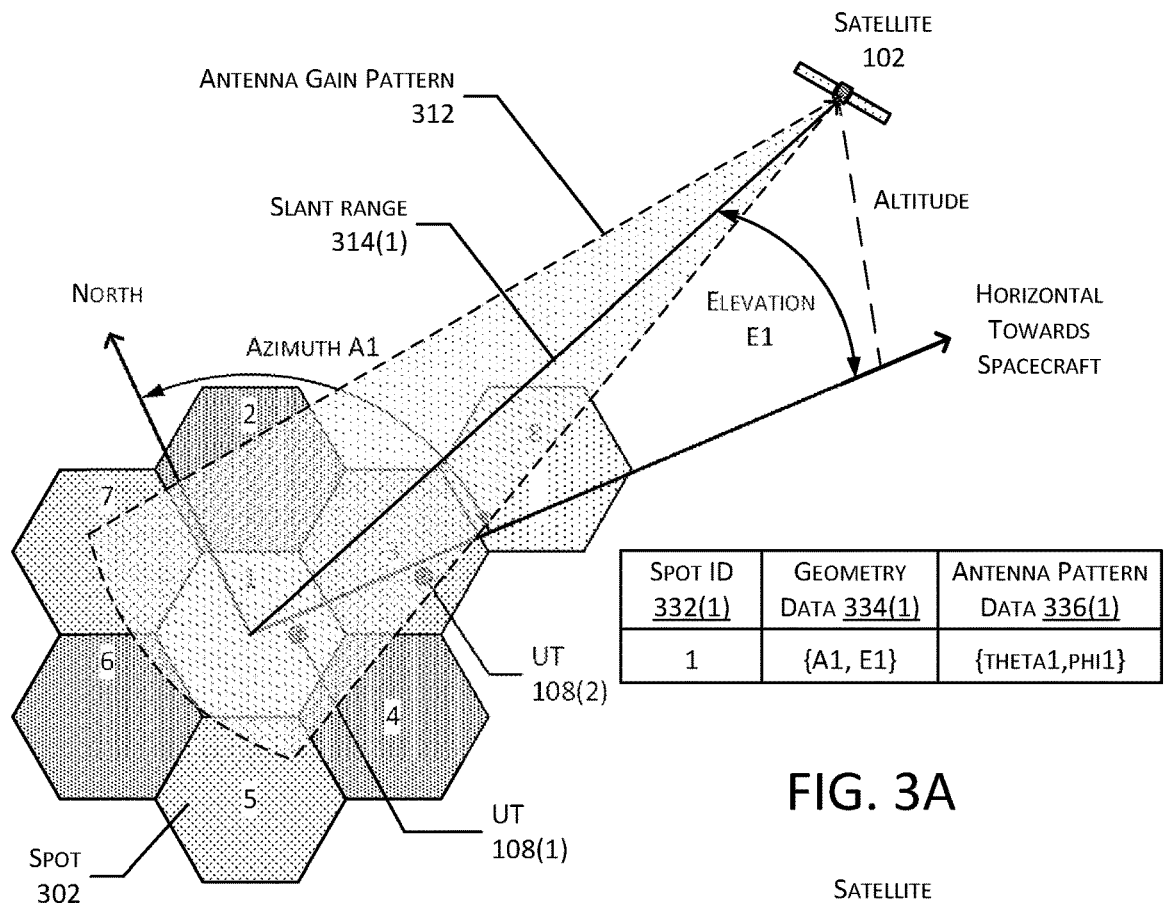
FIGS. 3A and 3B illustrate spots containing user terminals and their relative position with respect to the satellite, according to some implementations.
Figure 3B:
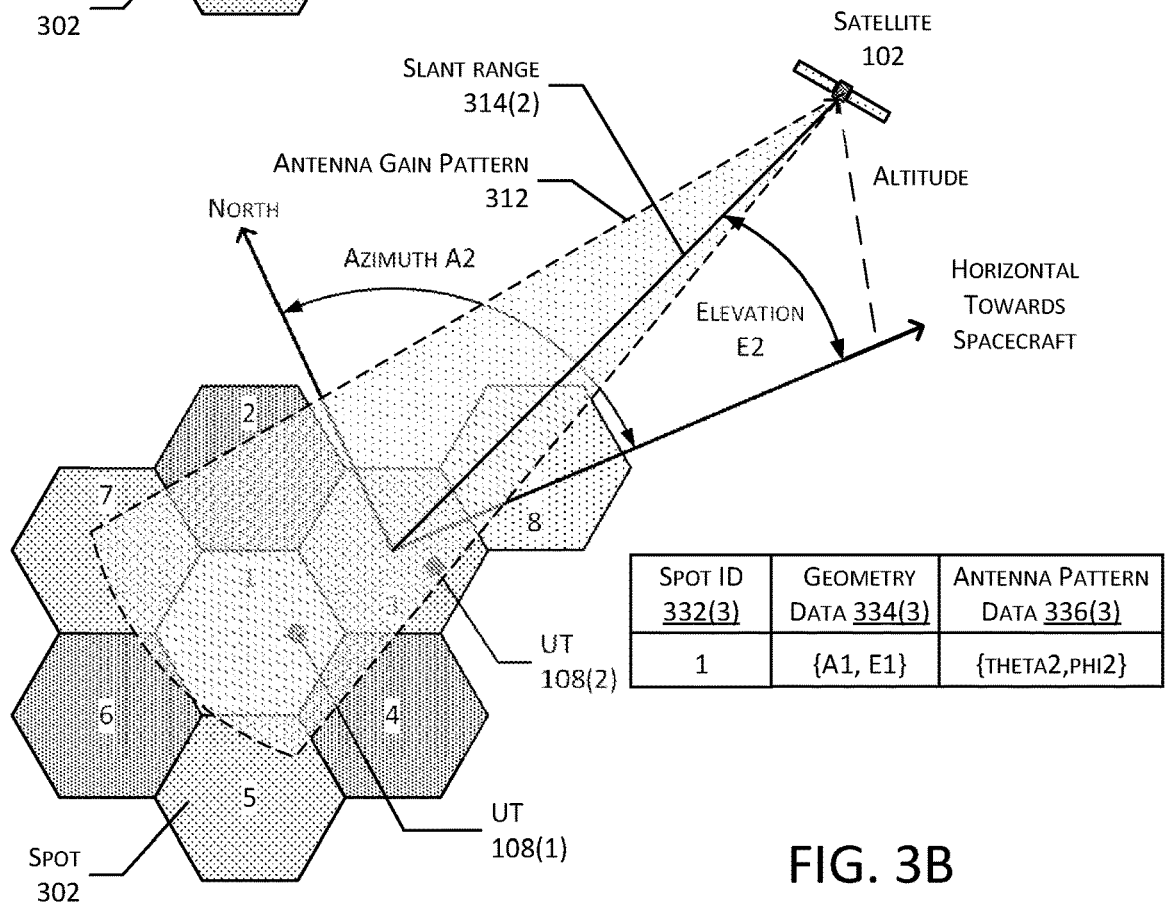

FIGS. 3A and 3B illustrate spots 302 containing UTs 108 and the relative position of the spots 302 with respect to the satellite 102, according to some implementations.

A spot 302 may comprise a spatial location, geographic area, and so forth. For example, the spatial location may comprise a portion of an orbit 104, a geographic area may comprise a specified area on Earth, and so forth. In the implementation depicted here, the spot 302 may comprise a geographic area on the Earth. One or more UTs 108 may be present within one or more spots 302.

The spots 302(1), 302(2), . . . , 302(S) may be arranged to cover at least a portion of a surface, physical area such as a portion of the sky, and so forth. For example, the Earth may be tessellated into spots 302 that are hexagonal or some other space filling polygon arrangement. In some implementations, a spot 302 may be sized to correspond to a footprint of a subbeam. For example, the spot 302 may comprise an area on the surface of the Earth that corresponds to an uplink subbeam and a downlink subbeam. In implementations in which the spots 302 are directed towards space, each spot 302 is associated with a respective physical area such as a solid angle of the sky, portion of an orbit, and so forth.

An antenna gain pattern 312 is depicted that represents a volume within which an expected link budget may be maintained for uplink communication from a UT 108 to the satellite 102. Antenna data 336 is indicative of the receive antenna gain pattern 312. For example, the antenna data 336 may comprise theta and phi angles that specify a solid angle and direction of the antenna gain pattern 312 relative to the satellite 102. The antenna data 336 may be based at least in part on, or is representative of, a beam roll-off indicative of an expected decrease in gain towards the perimeter of the antenna gain pattern 312.

A slant range 314 from a specified spot 302 to the satellite 102 is also depicted. The slant range 314 may be visualized as a line of sight path between a point, such as a geometric center of a spot 302 and the satellite 102.

Spot identifiers 332 are indicative of a particular spot 302. Geometry data 334 comprises azimuth and elevation between a spot 302 specified by a particular spot identifier 332 and the satellite 102. Azimuth is an angular measurement, in a horizontal plane, between geographic north and a direction towards the satellite 102. Elevation is an angular measurement in a vertical plane between a horizontal line and a direction towards the satellite 102. In one implementation, the geometry data 334 may be determined with respect to a geometric center of the spot 302. In other implementations, another point within the spot(s) 302 may be used. In some implementations, the geometry data 334 may include other information, such as the slant range 314 or other data indicative of distance.

FIG. 3A depicts the azimuth "A1" and elevation "E1" of spot 302(1) as specified by spot identifier 332(1) and corresponding geometry data 334(1). Spot 302(1) is covered by the antenna gain pattern 312 of the satellite 102. Also within the antenna gain pattern 312 of the satellite 102 are at least some portions of spots 302(2), 302(3), 302(4), 302(7), and 302(8). By way of illustration, and not as a limitation, UT 108(1) is shown at a geographic location that is within the spot 302(1), and UT 108(2) is shown at a geographic location that is within the spot 302(3).

FIG. 3B depicts azimuth "A2" and elevation "E2" of spot 302(3) as specified by spot identifier 332(3) and corresponding geometry data 334(3). From the perspective of the satellite 102, uplink transmissions sent by UTs 108 within the spots 302 covered by the antenna gain pattern 312 will be received by the satellite 102. If the uplink transmissions from the UTs 108 within these spots 302 use the same frequencies at the same time, the satellite 102 will experience co-channel interference. As a result of this co-channel interference, the satellite 102 may experience increased error rates on the uplink.

By utilizing the resource scheduler 116 as described in the following figures, interference from a plurality of end points, such as UTs 108 may be mitigated or eliminated entirely.

Figure 4:
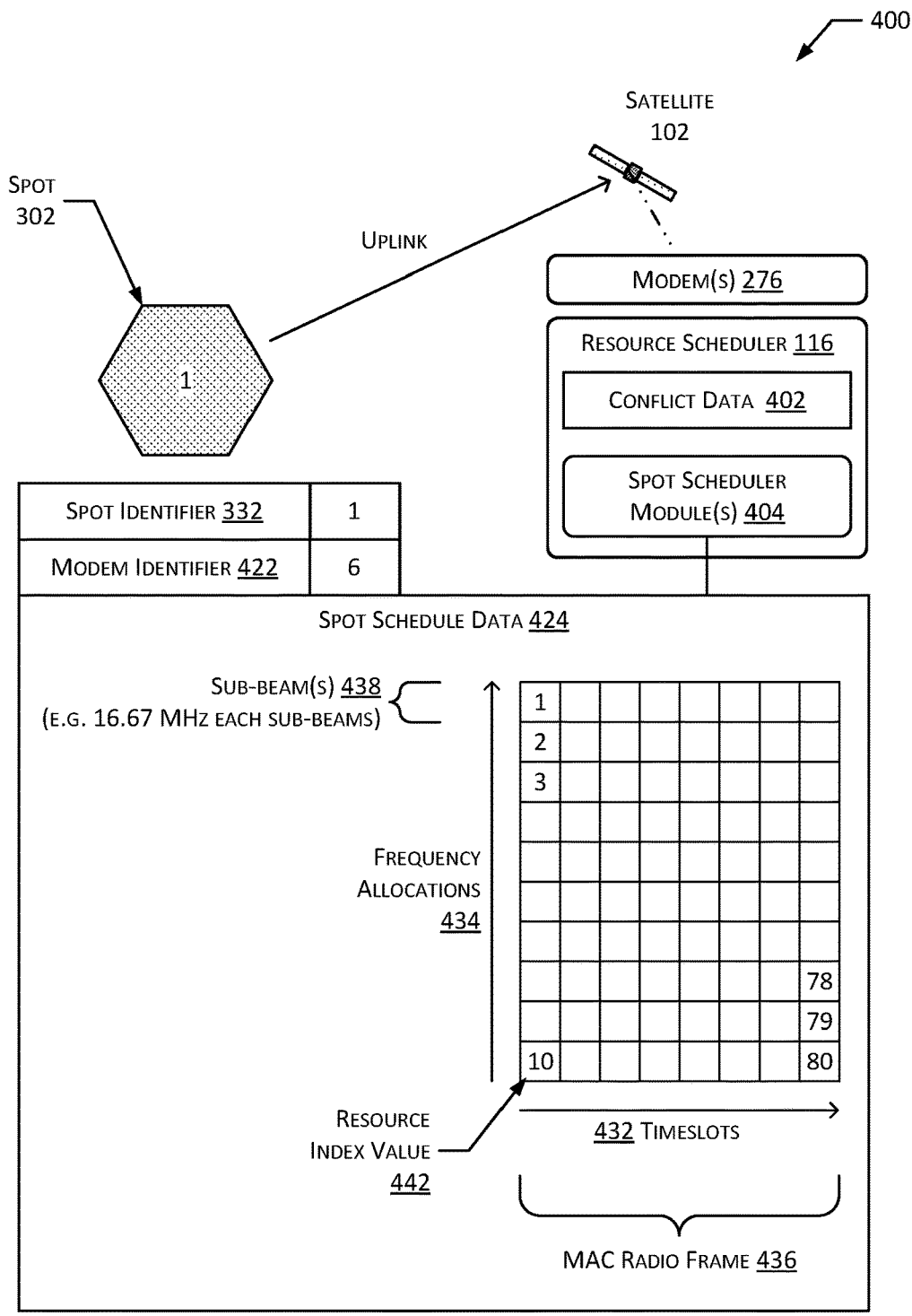
FIG. 4 depicts a block diagram of spot schedule data allocating uplink resources to the satellite, according to some implementations.

FIG. 4 depicts at 400 a block diagram of spot scheduler module 404 that determines spot schedule data 424 allocating uplink resources to the satellite 102, according to some implementations. The resource scheduler 116 onboard the satellite 102 may use the spot schedule data 424 to manage the uplink. Conflict data 402 is used to minimize or eliminate assignment of resources such as timeslot, frequency, and so forth that may result in interference with communication involving other spots 302. In one implementation the conflict data 402 may be determined onboard the satellite 102. In another implementation, at least a portion of the conflict data 402 may be received from an external source such as the ground station 106 or management system 150, and so forth. Determination of the conflict data 402 is discussed with respect to FIGS. 5-8.

One or more modems 276 may be allocated to provide communication to a specified spot 302. A spot scheduler module 404 determines spot schedule data 424 that allocates communication resources to participating devices, such as UTs 108 that are within, or expected to be within the spot 302.

In some implementations, the spot schedule data 424 may be associated with a particular spot identifier 332 and one or more modem identifiers 422 indicative of associated modems 276. For example, the spot schedule data 424 depicted in FIG. 4 is associated with providing communication service to UTs 108 within in the spot 302(1) having spot identifier 332(1) of "1" and using modem identifier 422 "6".

In this illustration, the spot schedule data 424 comprises a matrix specified by timeslots 432 and frequency allocations 434. The timeslots 432 specify respective time intervals during which an allocated device, such as a specified UT 108, may be permitted to transmit on the uplink to the satellite 102. Each timeslot 432 may be associated with a "subframe". The frequency allocations 434 specify one or more frequencies, channel, range of frequencies, specified sequence of frequencies, and so forth that may be used to transmit to the uplink to the satellite 102. For ease of discussion, and not as a limitation, frequency as used herein may represent one or more of a discrete frequency, channel, range of frequencies, specified sequence of frequencies, and so forth.

A media access control (MAC) radio frame 436 may comprise a specified set of timeslots 432. Sub-beams 438 may be associated with particular frequency allocations 434.

Also depicted are resource index values 442 indicating communication resources comprising different combinations of timeslots 432 and frequency allocation 434. In this illustration, the MAC radio frame 436 comprises 8 timeslots 432, with each timeslot 432 having 10 frequency allocations 434. As a result, during a MAC radio frame 436 there are a total of 80 resources that may be allocated.

The quantity of timeslots 432 and frequency allocations 434 are depicted by way of illustration and not as a limitation. For example, there may be hundreds of timeslots 432, hundreds of frequency allocations 434, and so forth.

During naïve operation without the conflict data 402, the spot scheduler module 404 will assign communication resources (depicted as the squares within the matrix) such that one communication resource is allocated to one UT 108 during any given timeslot 432. This naïve allocation prevents co-channel interface within the spot 302 serviced by the spot scheduler module 404.

As described above, the satellite 102 may comprise a plurality of communication resources. For example, the satellite 102 may include a plurality of modems 276 servicing a plurality of spots 302. As mentioned earlier, it has traditionally been infeasible to maintain coordination between various elements of the communication system 212. The conflict data 402 provided by the resource scheduler 116 as described next provides information to mitigate such interference.

Figure 5:
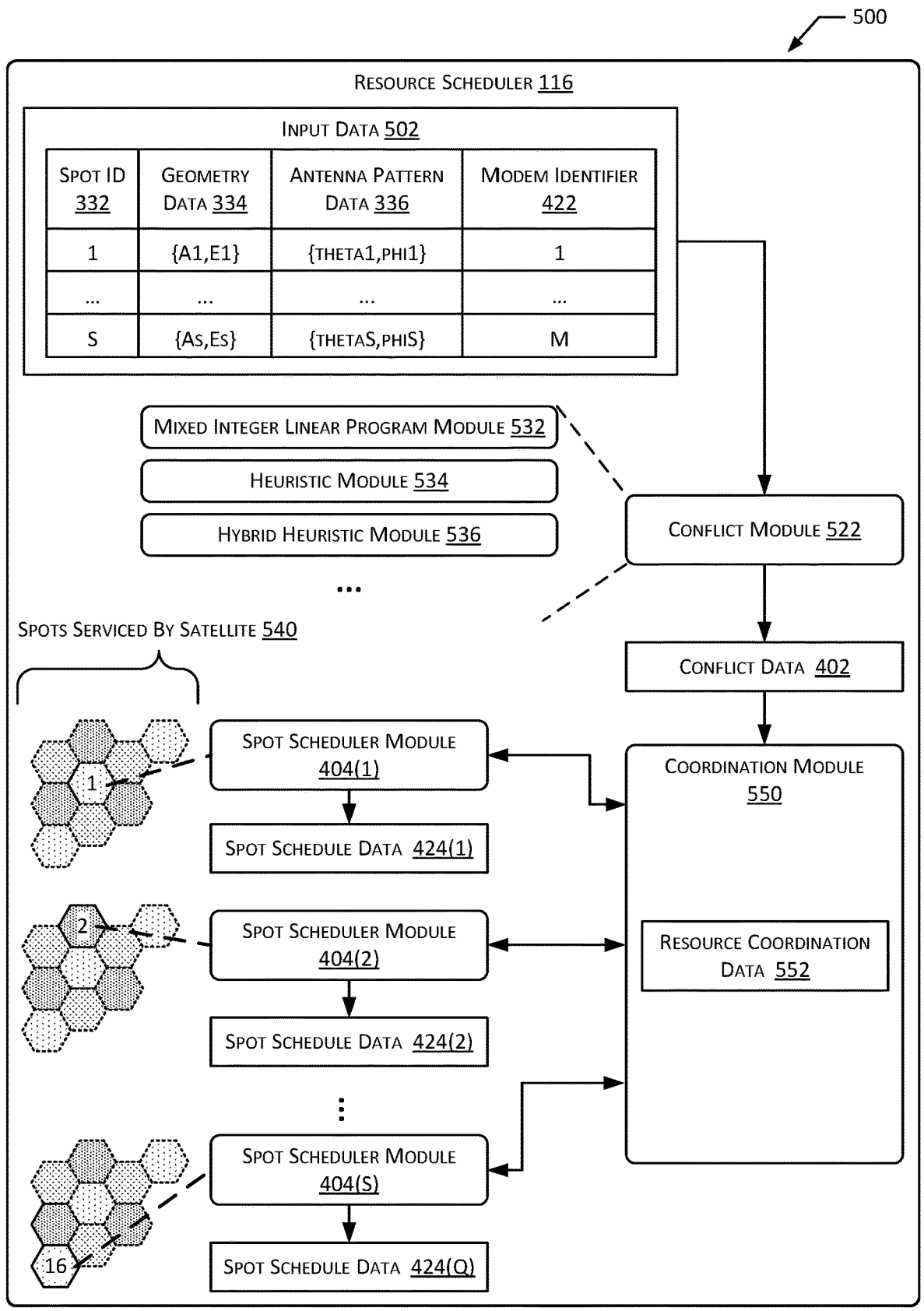
FIG. 5 depicts a resource scheduler that determines and uses conflict data to mitigate interference, according to some implementations.

FIG. 5 depicts at 500 the resource scheduler 116 that determines and uses conflict data 402 to mitigate interference, according to some implementations. Input data 502 is determined and provided to a conflict module 522 to determine the conflict data 402. The conflict data 402 may be determined on demand, at specified time intervals, responsive to specified conditions, and so forth. For example, the conflict data 402 may be determined at 5 second intervals. Because the conflict data 402 may be determined before the specific resource allocation as specified by the spot schedule data 424, the use of the conflict data 402 by the coordination module 550 eliminates the need for real-time communication between modems 276. As a result, the resource scheduler 116 may provide coordination of a larger number of communication resources.

The input data 502 may comprise one or more of spot IDs 332, geometry data 334, antenna data 336, modem identifiers 422 of associated modem(s), or other information. In some implementations, at least a portion of the input data 502 may be provided by the scheduling system 156. For example, the scheduling system 156 may send the spot IDs 332 that are to be serviced by the satellite 102 during a particular time interval. In some implementations, at least a portion of the input data 502 may be provided by another portion of the resource scheduler 116. In some implementations, the input data 502 may be based at least in part on the handover data 164. For example, the input data 502 may be determined for spots 302 associated with UTs 108 to be provided with service as specified in the handover data 164.

The conflict module 522 may utilize one or more modules that implement algorithms to determine the conflict data 402. The conflict data 402 may be representative of geographic areas, such as spots 302, that are covered by individual ones of the received antenna gain patterns 312 of the satellite 102. For example, the conflict data 402 may represent a relative received power level at the satellite 102 that may result from transmissions by UTs 108 that may be within respective spots 302. The conflict module 522 may include a mixed integer linear program module 532, a heuristic module 534, or a hybrid heuristic module 536. During operation, the conflict module 522 may operate to determine graph data, such as conflict data 402 comprising a conflict graph with a minimum possible graph degree. The vertexes within the graph may be representative of aspects of the system 100, such as spots 302, modems 276, and so forth. An edge may connect two vertexes. An edge weight is representative of interference that is expected between the vertexes. The greater the graph degree, the greater the potential interference. In the ideal situation, a conflict graph that has zero edges would be desired, indicating no interference is expected. Graphs are discussed in more detail with regard to FIG. 6.

The antennas 282 of the satellite 102 have defined uplink antenna gain patterns 312 that experience "roll-off" or a decrease in signal gain with respect to a centerline of the pattern. An antenna gain pattern 312 that is very tightly focused into a relatively small solid angle may experience a relatively large roll-off. In comparison, an antenna gain pattern 312 that covers a larger solid angle may experience a relatively small roll-off. Due to the changing geometry between the satellite 102 and the spots 302 the roll-off may vary based on the elevation angle of the satellite 102 with respect to the spot 302. For example, the portion of the antenna gain pattern 312 that intersects the surface of the Earth as the satellite 102 moves may change the footprint of the antenna gain pattern 312 on the Earth, forming at a first time an ellipse, a second later time a circle, and so forth.

Let a scan angle "$S_p$" be defined from the satellite 102 to a center of a spot 302 "p", and the elevation from the spot 302 "p" to the satellite 102 be designated "$E_p$". Let a roll-off threshold for spot 302 "p" be designated "$T_p$". The value of $T_p$ may be based on a number of sub-spots per spot 302 "p" and the scan angle $S_p$. In some implementations, a roll-off that is less than or equal to 25 decibels (dB) between UTs 108 results in a signal to interference plus noise ratio (SINR) that is 3 dB lower than the signal to noise ratio (SNR). In some implementations, to simplify operation, a point associated with a spot 302 may be used, such as a geographic center. In such a case, given the size of the spot 302 a margin of 5 dB may be added to account for possible UT 108 placement within the spot 302. In other implementations, the actual or estimated locations of UTs 108 may be used to determine the input data 502.

In some implementations, in which a single sub-beam is used per spot 302 then a $T_p$ value of 30 dB may be used. In some implementations where more than one sub-beam is used to service a spot 302, a piecewise linear model may be used. For example:

$T_p$=30 dB for $S_p \leq 15$ degrees, $E_p \geq 70$ degrees
$T_p$=35−$S_p$/3 for 15<$S_p \leq 30$ degrees, 50≤$E_p \leq 70$ degrees
$T_p$=37−2*$S_p$/5 for 30≤$S_p \leq 40$ degrees, 39≤$E_p$<=50 degrees
$T_p$=21 dB otherwise As a result of the changing geometry, at different relative positions in the orbit 104, the satellite 102 may receive, in a particular subbeam, signals from multiple UTs 108. If these additional signals overlap in time and frequency, they will interfere with one another.

In one implementation, the mixed integer linear program (MILP) module 532 may determine an optimum allocation of communication resources to spots 302 by determining a conflict graph having a lowest possible graph degree. For the following let R indicate the resources (such as the combinations of timeslots 432 and frequency allocations 434) and let S indicate the spots 302. The number of optimization variables for the MILP is then equal to 2*R*S. Some of these variables dictate that the resource allocation of a spot 302 to a certain resource is binary-valued (0 or 1). The other variables determine the graph degree of each spot 302 for each resource.

The MILP may have the following four constraints:
The assignment optimization variables are binary-valued.
The graph degree optimization variables are non-negative.

Equality Constraint 1: For each modem 276, each resource has to be assigned to exactly one spot 302. There are M*R such constraints where M designates the number of modems 276 and each modem 276 is associated with a primary beam.

Equality Constraint 2: Any feasible solution has to assign each spot 302 with its target number of resources as determined by the spot scheduler module 404. There are S such constraints.

Constraints 1

The number of constraints may be specified as follows:
(S+M*R) equality constraints. The equality constraint matrix occupies a storage space equaling (S+M*R)× 2*S*R.
2*E*R inequality constraints where E is the number of edges in the conflict graph.

Constraints 2

In the following implementation, the MILP module 532 may implement the following algorithm. For this algorithm let:

P: Set of spots 302 that are served with $n_p$ sub-beams.
p∈ P: a spot 302 for planning, M(p): modem 276 serving the spot 302.
INTRF (p): Set of spot 302 neighbors within P with beam roll-off below threshold (e.g. 25 dB) towards spot 302 p.
K: set of available resources per modem.
$y_{p,k}$: optimization variable indicating whether spot 302 p∈ P is assigned to resource k∈ K in satellite 102 s.
$d_{p,k}$: optimization variable indicating the graph degree of the conflict graph induced by an allocation γ.

Variables 1

Given these variables, the following equations may be used to determine the conflict graph as expressed in the conflict data 402, subject to the following constraints.

$$(\hat{y}, \hat{d}) = \min \sum_{p \in P} \sum_{k \in K} d_{p,k} \quad \text{EQUATION 1}$$

$$y_{p,k} \in (0,1) \quad \text{EQUATION 2}$$

Subject to constraint C1 below.

$$\sum_{k \in K} y_{p,k} = n_p \quad \text{EQUATION 3}$$

Subject to constraint C2 below.

$$Y_{p,k}+Y_{q,k}=1 \forall p,q \text{ s.t.} M(p)=M(q) \quad \text{EQUATION 4}$$

Subject to constraint C3 below.

$$d_{p,k} \geq 0 \quad \text{EQUATION 5}$$

Subject to constraint C4 below.

$$\sum_{q \in INTRF(p)} y_{q,k} \leq d_{p,k} + |INTRF(p)| \times (1-y_{p,k}) \quad \text{EQUATION 6}$$

Subject to constraint C5 below.

With the constraints specified as follows:
C1: Optimization variable $y_{p,k}$ is binary.
C2: Planning spot 302 is assigned $n_p$ sub-beams.
C3: Each sub-beam can be assigned to single spot 302 per modem 276.
C4: Conflict graph degree for spot 302 p on resource k is non-negative.
C5: Relates conflict graph degree d to the binary assignment variable y.
Constraint Set 1

The conflict module 522 may implement the heuristic module 534. In one implementation, the heuristic module 534 may implement a greedy heuristic approach. The greedy heuristic approach utilizes a specified number of iterations of proposed graph data with the resulting conflict data 402 being representative of a resulting conflict graph that has a lowest graph degree.

The greedy heuristic approach may utilize as input information indicative of the modems 276 and their allocation to respective spots 302. This information is indicative of the resources assigned per spot 302, but not the specific allocation of those resources. Given M resources (M being a multiple of the available sub-beams 438 divided by the timeslots 432), each spot 302 $P_i$ is assigned $M_i$ resources such that M1+M2+ ... Mp≤M. If M equals the number of sub-beams 438 then the resource assignment occurs for a single timeslot 432. If M is larger than the number of sub-beams 438, the resource assignment occurs over a plurality of timeslots 432.

The heuristic module 534 determines a conflict graph where the vertexes represent spots 302 and the edges between the vertexes are representative of the roll-off being within the beam roll-off threshold. A single conflict graph may be determined for each satellite 102 or other device comprising a plurality of modems 276.

The heuristic module 534 may iteratively generate a set of proposed conflict graphs, each proposed graph data having a greedy assignment of resources to spots 302 per modem 276. For each proposed conflict graph, a graph degree may be determined. The proposed conflict graph having the lowest graph degree may be retained and subsequently used. In some implementations, elements of proposed conflict graphs may be retained from one iteration to another.

The hybrid heuristic module 536 may specify protected portions of the matrices of resources to be allocated that are reserved, with the protected portions configured to avoid interference. Unprotected portions may be assigned based on conflict data 402 determined using the greedy heuristic as mentioned above. For example, the protected portions may specify particular combinations of timeslots 432 and frequency allocation 434. The individual modems 276 and their respective spot scheduler modules 404 may assign resources within the protected portions without regard to the conflict data 402. Assignment of resources in unprotected regions may be determined based on the conflict data 402.

As described above, the satellite 102 provides communication services to a set of spots serviced by the satellite 540. The spot scheduler module 404 may determine the spot schedule data 424 that assigns specific communication resources to be used by devices, such as UTs 108 that are within a particular spot 302, to communicate with the satellite 102.

The coordination module 550 receives the conflict data 402 and coordinates the operation of the respective spot scheduler modules 404(1), ..., 404(S). The coordination module 550 may process the conflict data 402 to determine resource coordination data 552 that is indicative of particular resources, resource constraints, and so forth. The resource coordination data 552 may be specific to the particular spot scheduler module 404. For example, resource coordination data 552(1) provided to spot scheduler module 404(1) may consist of the portion of the conflict data 402 that is associated with the spot 302(1) or a modem 276(1) associated with the spot 302(1).

The spot scheduler modules 404 may then determine their respective spot schedule data 424 based on the resource coordination data 552. The resulting spot schedule data 424(1), ..., 424(Q) results in reduced interference, improving system performance.

During testing involving a small set of modems 276 and timeslots 432, operation without the resource coordination data 552 resulted in an average packet error rate (PER) of 4.8E-4. In comparison, testing using the resource coordination data 552 based on the conflict data 402 provided by the MILP module 532, resulted in an average PER of 0 (zero).

While the system 100 is described with respect to allocation of uplink resources from UTs 108 to a satellite 102, the system 100 and techniques may be readily applied to other situations. For example, a ground station 106 that maintains communication with a plurality of satellites 102 may use the resource scheduler 116. In another implementation, a UT 108 capable of connecting to multiple satellites 102 simultaneously or concurrently may use the resource scheduler 116.

In some implementations, the operation of the resource scheduler 116 or portions thereof may be distributed across different devices. In one implementation, the management system 150 may determine the conflict data 402. The conflict data 402 may then be sent to the satellite 102 for use by the coordination module 550. For example, the scheduling system 156 or other system may determine one or more of conflict data 402, handover data 164, or other data that is then transmitted to the satellite 102 for use by the resource scheduler 116. In another implementation the management system 150 may determine a portion of the conflict data 402. For example, at least a portion of a conflict graph may be generated by the management system 150 and data representative of the conflict graph is then sent to the satellite 102. The satellite 102 may then process the at least a portion of the conflict graph to determine the conflict data 402. In other implementations other distributions of processing may be used to determine at least a portion of the conflict data 402 external to the satellite 102.

Figure 6:
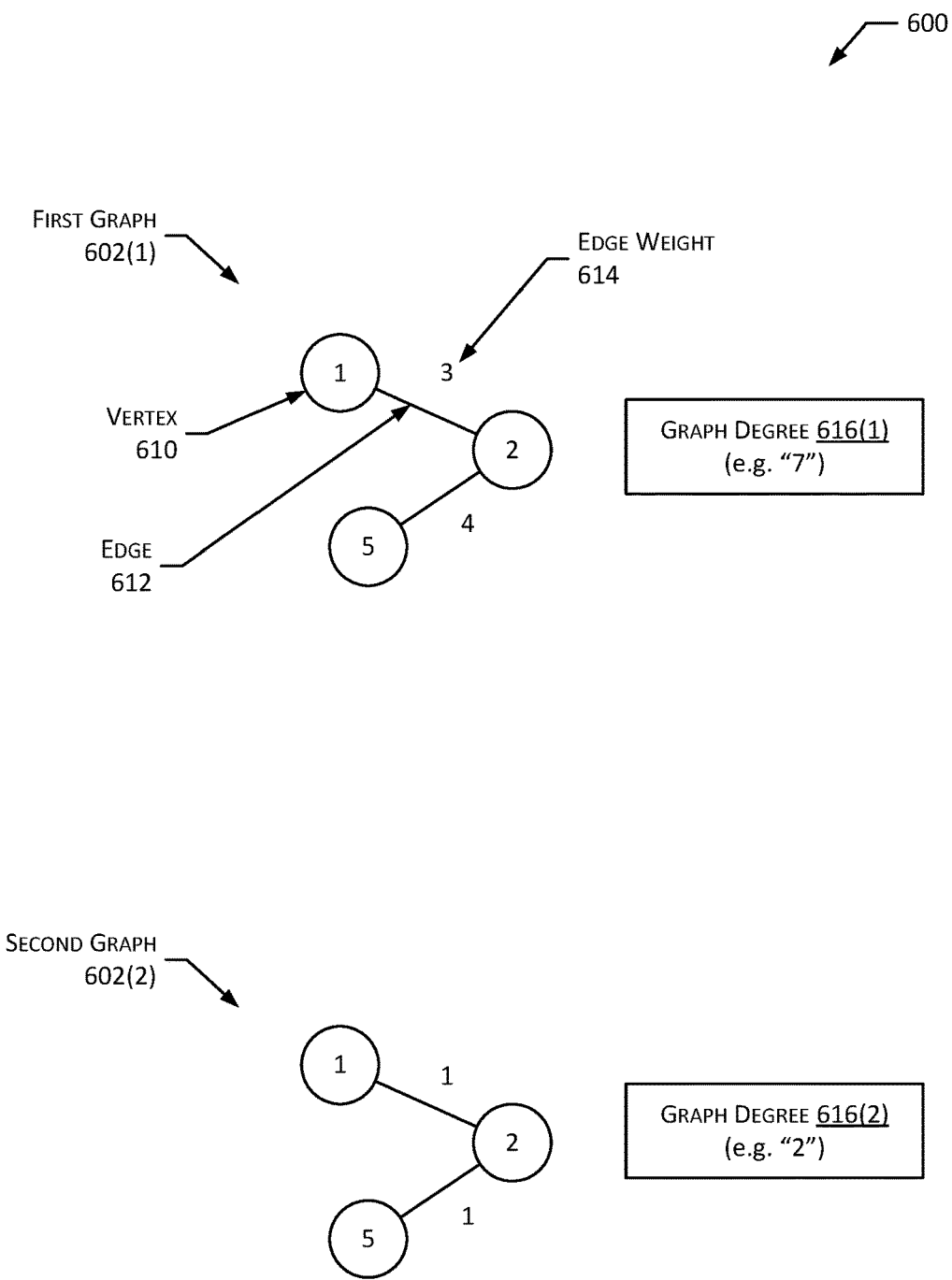
FIG. 6 depicts example graphs and their constituents, according to some implementations.

FIG. 6 depicts at 600 example graphs and their constituents, according to some implementations. Graphs may comprise vertexes 610 and edges 612 that connect the vertexes 610. The vertexes 610 may be representative of spots 302, modems 276, or other aspects of the system 100. An edge weight 614 is representative of interference that is expected between the vertexes 610. For example, if the vertexes 610 represent spots 302, the edge weight 614 may represent the number of resources (such as specified by the spot schedule data 424) where UTs 108 in the adjacent spots 302 (on either end of an edge 612) are simultaneously transmitting. The graphs may be directed or undirected.

A graph degree 616 is a sum of edge weights 614 of a connected graph.

A first graph 602(1) comprises three vertexes 610(1), 610(2), and 610(5) and respective edge weights 614. The graph degree 616(1) of the first graph 602(1) has a value of "7".

A second graph 602(2) comprises three vertexes 610(1), 610(2), and 610(5) and respective edge weights 614. In this second graph 602(2), while the vertexes 610 are the same, the edge weights 614 differ. As a result, the graph degree 616(2) of the second graph 602(2) has a value of "2".

In implementations where the conflict data 402 is expressed as graphs, the edge weights 614 of a conflict graph are representative of the potential for interference between aspects of the system 100. The greater the graph degree 616, the greater the potential for interference. In the ideal situation, a graph that has zero edges 612 would be desired, indicating no interference is expected. During operation, the conflict module 522 may operate to determine, based on the input data 502, conflict data 402 that has a minimum graph degree 616.

Figure 7:
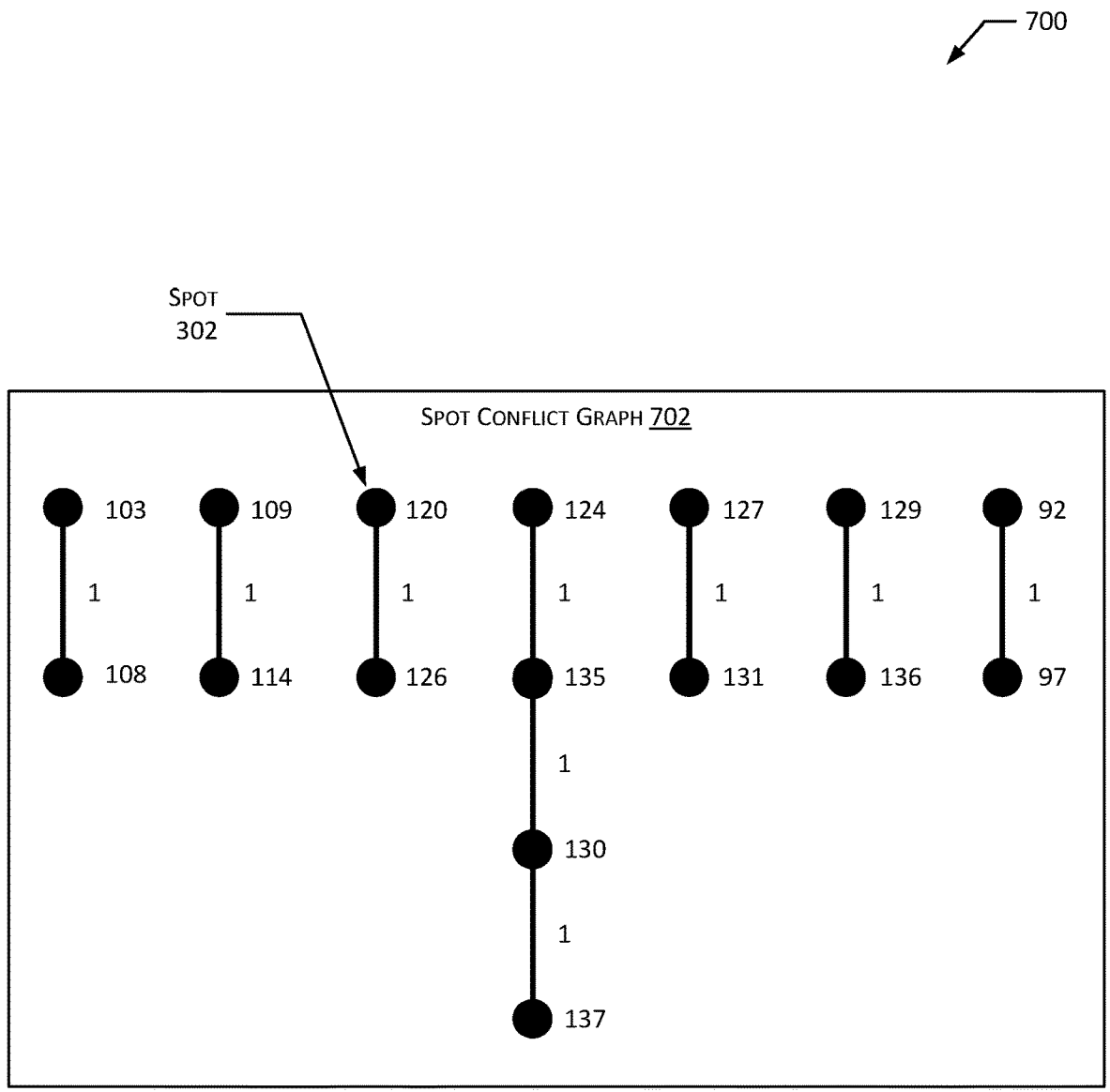
FIG. 7 depicts a spot conflict graph indicative of spots serviced by a satellite that may be subject to interference, according to some implementations.

FIG. 7 depicts at 700 a spot conflict graph 702 indicative of spots 302 serviced by a satellite 102 that may be subject to interference, according to some implementations. In this illustration, the vertexes 610 are representative of particular spots 302, or the spot identifiers 332 associated therewith. Not shown are graphs with a single vertex 610 and thus having a zero graph degree 616 (e.g., no interference expected).

With respect to the spot conflict graph 702, an edge 612 may be deemed present between two vertexes 610 representing spot identifiers 332 of spots 302 if a roll-off of the antenna gain pattern 312, such as associated with a main beam, from one spot 302 to another is less than the roll-off threshold $T_p$. In such a condition, a pair of spots 302 connected by an edge 612 are deemed to be indicative of spots 302 that, if they contain UTs 108 transmitting at the same time and frequency, and given the antenna pattern data 336, would result in a relative receive power level at the satellite 102 that is greater than a threshold value. Such a condition may result in interference during reception at the satellite 102.

During operation, the coordination module 550 may use the spot conflict graph 702 to direct the operation of the spot scheduler modules 404. For example, spot identifiers 332 indicative of spots 302(124), 302(135), 302(130), and 302(137) comprise a single graph having a graph degree 616 of "3". The spot conflict graph 702, or the resource coordination data 552 based thereon, may be provided to the respective spot scheduler modules 404 associated with these spots 302 to determine spot schedule data 424 that avoids a potential conflict with the adjacent spots 302 indicated by the spot conflict graph 702. For example, based on the resource coordination data 552 the spot scheduler module 404(124) may be restricted in its allocation of some resources such as timeslots 432 or frequency allocations 434 to avoid issuing conflicting resources with the spot scheduler 404(135).

Figure 8:
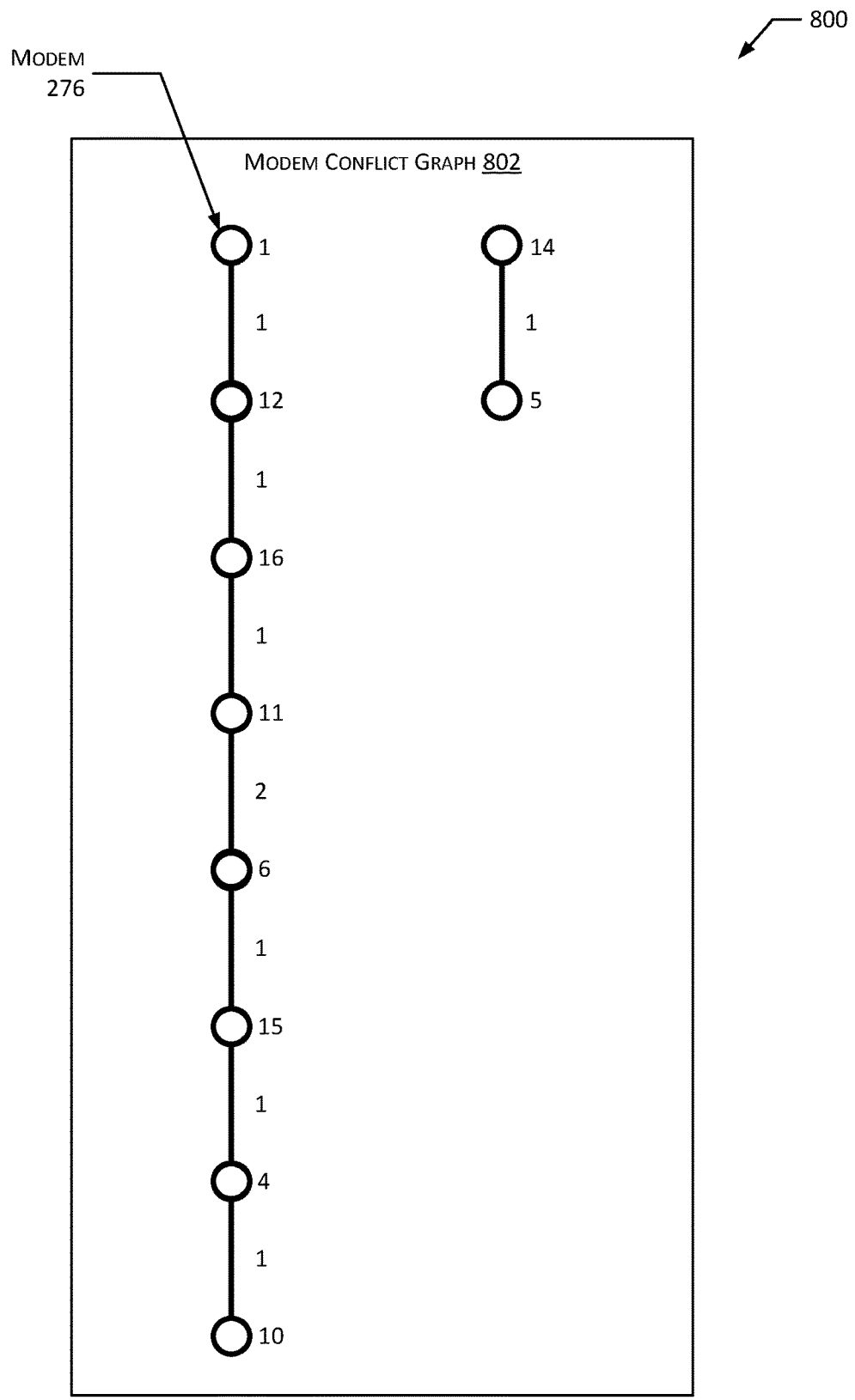
FIG. 8 depicts a modem conflict graph indicative of modems used by a satellite that may be subject to interference due to the spots the respective modems are providing communication services for, according to some implementations.

FIG. 8 depicts at 800 a modem conflict graph 802 indicative of modems 276 used by a satellite 102 that may be subject to interference due to the spots 302 the respective modems 276 are providing communication services for, according to some implementations.

In this illustration, the vertexes 610 are representative of modem identifiers indicative of particular modems 276. Not shown are graphs with a single vertex 610 and thus having a zero graph degree 616 (e.g., no interference expected).

With respect to the modem conflict graph 802, an edge 612 of two vertexes 610 representing modem identifiers of modems 276 is indicative of pairs of spots 302 that are associated with a single modem 276 and share an edge 612 in the spot conflict graph 702. In such a condition, a pair of modems 276 connected by an edge 612 are deemed to be indicative of modems 276 that are servicing spots 302 that, if they contain UTs 108 transmitting at the same time and frequency, and given the antenna pattern data 336, would result in a relative receive power level at the satellite 102 that is greater than a threshold value. Such a condition may result in interference during reception at the satellite 102.

During operation, the coordination module 550 may use the modem conflict graph 802 to determine which modems 276 and their associated spots 302 may be subject to interference and direct the operation of the spot scheduler modules 404. For example, modems 276(1), 276(12), 276(16), 276(11), 276(6), 276(15), 276(4), and 276(10) comprise a single graph having a graph degree 616 of "8". The modem conflict graph 802, or the resource coordination data 552 based thereon, may be provided to the respective spot scheduler modules 404 associated with these modems 276 to determine spot schedule data 424 that avoids a potential conflict between modems 276 servicing spots 302 that could, if they contain UTs 108 transmitting at the same time and frequency, result in received power levels at the satellite 102 that exceed a threshold value. For example, based on the resource coordination data 552 the spot scheduler modules 404 assigned to modems 276(11) and 276(6) may be restricted in its allocation of some resources such as timeslots 432 or frequency allocations 434 to avoid issuing conflicting resources.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A satellite comprising:
   one or more phased antenna arrays (PAAs);
   a first set of modems, wherein each modem in the first set of modems is connected to a respective one of the one or more PAAs;
   a first memory; and
   a first set of one or more processors executing instructions to:
     determine input data comprising one or more of:
       a first set of modem identifiers, wherein each modem identifier is indicative of a respective one of a first set of modems,
       a first set of spot identifiers, wherein each spot identifier is indicative of a respective geographic area,
       a first set of geometry data comprising, for a respective spot identifier, an azimuth and elevation from the respective geographic area to the satellite, or a first set of antenna data indicative of a receive gain pattern of the one or more PAAs with respect to the respective geographic areas;
     determine, based on the input data, conflict data indicative of potential interference, wherein the conflict data is representative of geographic areas covered by individual ones of the receive gain patterns of the one or more PAAs;
     determine, based on the conflict data, resource coordination data that would mitigate the potential interference, wherein the resource coordination data is indicative of one or more of: a modem identifier from the first set of modem identifiers that is indicative of a respective modem, a spot identifier from the first set of spot identifiers that is indicative of a respective geographic area, a frequency, or a timeslot; and
     operate the first set of modems based on the resource coordination data such that pairs of geographic areas that are covered by a common receive gain pattern of an antenna associated with one of the first set of modems utilize different combinations of frequency and timeslot.

2. The satellite of claim 1, the first set of one or more processors further executing the instructions to:
   determine a first plurality of user terminals to communicate with the satellite;
   determine a first set of geographic areas, wherein each geographic area is associated with one of the first plurality of user terminals; and
   determine the first set of spot identifiers based on the first set of geographic areas.

3. The satellite of claim 1, the first set of one or more processors further executing the instructions to:
   determine graph data indicative of a graph wherein:
     vertexes of the graph are representative of one or more of: at least a portion of the modem identifiers of the first set of modem identifiers, or at least a portion of the spot identifiers of the first set of spot identifiers; and
     edge weights of the graph are representative of interaction between roll-off of associated receive gain patterns, wherein the graph exhibits a minimum graph degree given the input data; and
   wherein the conflict data is based on the graph data.

4. The satellite of claim 1, the first set of one or more processors further executing the instructions to:
   calculate graph data indicative of a graph using a mixed integer linear program, wherein:
     vertexes of the graph are representative of one or more of: at least a portion of the modem identifiers of the first set of modem identifiers, or at least a portion of the spot identifiers of the first set of spot identifiers; and
     edge weights of the graph are representative of interaction between roll-off of associated receive gain patterns, wherein the graph exhibits a minimum graph degree given the input data; and
   wherein the conflict data is based on the graph data.

5. The satellite of claim 1, the first set of one or more processors further executing the instructions to:
   determine first proposed graph data indicative of a first graph, wherein:
     vertexes of the first graph are representative of one or more of: at least a portion of the modem identifiers of the first set of modem identifiers, or at least a portion of the spot identifiers of the first set of spot identifiers; and
     edge weights of the first graph are representative of interaction between roll-off of associated receive gain patterns;
   determine a first graph degree comprising a sum of the edge weights of the first proposed graph data;
   determine second proposed graph data indicative of a second graph, wherein:

vertexes of the second graph are representative of one or more of: at least a portion of the modem identifiers of the first set of modem identifiers, or at least a portion of the spot identifiers of the first set of spot identifiers; and edge weights of the second graph are representative of interaction between roll-off of associated receive gain patterns;

determine a second graph degree comprising a sum of the edge weights of the second proposed graph data;

determine the second graph degree is less than the first graph degree; and wherein the conflict data is based on the second proposed graph data.

6. The satellite of claim 1, wherein the conflict data is determined using one or more of:
a mixed integer linear program module,
a heuristic module, or
a hybrid heuristic module.

7. A method comprising:
determining input data comprising one or more of:
a first set of modem identifiers, wherein each modem identifier is indicative of a respective one of a first set of modems of a first device,
a first set of spot identifiers, wherein each spot identifier is indicative of a respective physical area,
a first set of geometry data comprising, for a respective spot identifier, an azimuth and elevation from the respective physical area to the first device, or
a first set of antenna data indicative of receive gain patterns of one or more antennas associated with the first set of modems;
determining, based on the input data, conflict data indicative of potential interference, wherein the conflict data is representative of physical areas covered by individual ones of respective receive gain patterns of the one or more antennas, and wherein the determining the conflict data comprises:
calculating first graph data indicative of a first graph comprising:
first vertexes representative of: modem identifiers, or spot identifiers, and
first edge weights that are representative of interference expected between the first vertexes; and
determining, based on the conflict data, resource coordination data that would mitigate the potential interference, wherein the resource coordination data is indicative of one or more of: a modem identifier, a spot identifier, a frequency, or a timeslot.

8. The method of claim 7, further comprising:
operating the first set of modems based on the resource coordination data such that pairs of physical areas that are covered by a common receive gain pattern of an antenna associated with one of the first set of modems utilize different combinations of frequency and timeslot.

9. The method of claim 7, wherein the first device is a satellite in orbit, and further comprising:
determining a first plurality of user terminals to communicate with the first device;
determining a first set of geographic areas, wherein each geographic area is associated with at least one of the first plurality of user terminals; and
determining the first set of spot identifiers based on the first set of geographic areas.

10. The method of claim 7, wherein the first device is a ground station, and further comprising:

determining a first plurality of satellites to communicate with the first device;
determining a first set of physical areas, wherein each physical area is associated with one of the first plurality of satellites; and
determining the first set of spot identifiers based on the first set of physical areas.

11. The method of claim 7, wherein:
the first graph exhibits a minimum graph degree given the input data.

12. The method of claim 7, wherein:
the first graph data indicative of the first graph is calculated using a mixed integer linear program, and
the first graph exhibits a minimum graph degree given the input data.

13. The method of claim 7, wherein the first edge weights are further representative of interaction between roll-off of associated receive gain patterns; and further comprising:
determining a first graph degree comprising a sum of the first edge weights;
determining second graph data indicative of a second graph comprising:
second vertexes representative of one or more of: at least a portion of the modem identifiers of the first set of modems, or at least a portion of the spot identifiers of the first set of spot identifiers; and
second edge weights that are representative of interaction between roll-off of associated receive gain patterns;
determining a second graph degree comprising a sum of the second edge weights;
determining the first graph degree is less than the second graph degree; and
wherein the conflict data is based on the first graph data.

14. A first device comprising:
one or more antennas;
a first set of modems, wherein each modem in the first set of modems is connected to one of the one or more antennas;
a first memory; and
a first set of one or more processors executing instructions to:
determine input data comprising one or more of:
a first set of modem identifiers, wherein each modem identifier is indicative of a respective one of a first set of modems,
a first set of spot identifiers, wherein each spot identifier is indicative of a respective physical area,
a first set of geometry data comprising, for a respective spot identifier, an azimuth and elevation from the respective physical area to the first device, or
a first set of antenna data indicative of a receive gain pattern of the one or more antennas;
determine, based on the input data, conflict data indicative of potential interference, wherein the conflict data is representative of physical areas covered by respective receive gain patterns of the one or more antennas, wherein the instructions to determine the conflict data further include instructions to:
determine first graph data indicative of a first graph comprising:
first vertexes representative of one or more of modem identifiers or spot identifiers, and
first edge weights that are representative of interaction between roll-off of associated receive gain patterns; and determine, based on the conflict data, resource coordination data that would mitigate the potential interference, wherein the resource coordination data is indicative of one or more of: a modem identifier, a spot identifier, a frequency, or a timeslot.

15. The first device of claim 14, the first set of one or more processors further executing the instructions to:
   operate the first set of modems based on the resource coordination data such that pairs of physical areas that are covered by a common receive gain pattern of an antenna associated with one of the first set of modems utilize different combinations of frequency and timeslot.

16. The first device of claim 14, the first set of one or more processors further executing the instructions to:
   determine a first plurality of user terminals to communicate with the first device;
   determine a first set of physical areas, wherein each physical area is associated with at least one of the first plurality of user terminals; and
   determine the first set of spot identifiers based on the first set of physical areas.

17. The first device of claim 14, the first set of one or more processors further executing the instructions to:
   determine a first plurality of satellites to communicate with the first device;
   determine a first set of physical areas, wherein each physical area is associated with one of the first plurality of satellites; and
   determine the first set of spot identifiers based on the first set of physical areas.

18. The first device of claim 14, wherein:
   the first graph exhibits a minimum graph degree given the input data.

19. The first device of claim 14, wherein:
   the first graph data indicative of the first graph is calculated using a mixed integer linear program, and
   the first graph exhibits a minimum graph degree given the input data.

20. The first device of claim 14, the first set of one or more processors further executing the instructions to:
   determine a first graph degree comprising a sum of the first edge weights;
   determine second graph data indicative of a second graph comprising:
      second vertexes representative of one or more of: modem identifiers, or spot identifiers; and
      second graph second edge weights that are representative of interaction between roll-off of associated receive gain patterns;
   determine a second graph degree comprising a sum of the second edge weights;
   determine the first graph degree is less than the second graph degree; and
   wherein the conflict data is based on the first graph data.

\* \* \* \* \*

UNITED STATES PATENT AND TRADEMARK OFFICE
CERTIFICATE OF CORRECTION

PATENT NO. : 12,368,502 B1
APPLICATION NO. : 17/662952
DATED : July 22, 2025
INVENTOR(S) : Vikram Chandrasekhar et al.

Page 1 of 1

It is certified that error appears in the above-identified patent and that said Letters Patent is hereby corrected as shown below:

In the Claims

Column 28, Claim 20, Line 20:
Currently reads "second graph second edge weights that are representative"
Where it should read --second edge weights that are representative--

Signed and Sealed this
Twenty-sixth Day of August, 2025

Coke Morgan Stewart
*Acting Director of the United States Patent and Trademark Office*